(12) United States Patent
Mifune et al.

(10) Patent No.: US 6,875,463 B2
(45) Date of Patent: Apr. 5, 2005

(54) PASTE FOR TRANSPARENT INSULATING FILM, PLASMA DISPLAY PANEL, METHOD OF MANUFACTURING PASTE, METHOD OF MANUFACTURING TRANSPARENT INSULATING FILM, AND METHOD OF MANUFACTURING PLASMA DISPLAY PANEL

(75) Inventors: Tastuo Mifune, Katano (JP); Tomohiro Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/422,109

(22) Filed: Apr. 24, 2003

(65) Prior Publication Data

US 2003/0207024 A1 Nov. 6, 2003

Related U.S. Application Data (62) Division of application No. 10/011,352, filed on Dec. 5, 2001, now abandoned.

(30) Foreign Application Priority Data

Dec. 5, 2000 (JP) .................................... 2000-370542
Aug. 28, 2001 (JP) .................................... 2001-258561

(51) Int. Cl.$^7$ ................................................ B05D 5/12
(52) U.S. Cl. .............................. 427/64; 427/68; 445/24
(58) Field of Search ................................ 427/58, 64, 68, 427/162; 501/22, 32, 52; 445/24

(56) References Cited

U.S. PATENT DOCUMENTS

| | | | |
|---|---|---|---|
| 5,714,840 A | * | 2/1998 | Tanabe et al. ............... 313/581 |
| 6,197,480 B1 | | 3/2001 | Iguchi et al. |
| 6,333,600 B1 | * | 12/2001 | Mizobata ..................... 313/587 |
| 6,362,799 B1 | * | 3/2002 | Ueoka et al. ................. 345/60 |
| 6,383,961 B1 | * | 5/2002 | Ryu ............................. 501/32 |
| 6,420,831 B2 | * | 7/2002 | Awaji et al. ................. 313/586 |
| 6,497,962 B1 | | 12/2002 | Fujimine et al. |
| 6,621,215 B1 | * | 9/2003 | Su et al. ...................... 313/582 |

FOREIGN PATENT DOCUMENTS

| | | | |
|---|---|---|---|
| JP | 08-119665 | | 5/1996 |
| JP | 08-162027 | | 6/1996 |
| JP | 10-156283 | | 6/1998 |
| JP | 10-310450 | | 11/1998 |
| JP | 10-310451 | | 11/1998 |
| JP | 144623 | * | 5/1999 |
| JP | 11-167861 | * | 6/1999 |
| JP | 2003-104756 | * | 4/2003 |

* cited by examiner

Primary Examiner—Brian K. Talbot
(74) Attorney, Agent, or Firm—RatnerPrestia (57) ABSTRACT

Paste for a transparent insulating film of a plasma display panel, the paste including powder glass contains lead oxide, silicon oxide, boron oxide, barium oxide, and aluminum oxide, solvent, and resin.

9 Claims, 4 Drawing Sheets

PASTE FOR TRANSPARENT INSULATING FILM, PLASMA DISPLAY PANEL, METHOD OF MANUFACTURING PASTE, METHOD OF MANUFACTURING TRANSPARENT INSULATING FILM, AND METHOD OF MANUFACTURING PLASMA DISPLAY PANEL

This application is a divisional of U.S. patent application Ser. No. 10/011,352, filed Dec. 5, 2001, now abandoned.

BACKGROUND OF THE INVENTION

1. Field of the Invention

The present invention relates to paste for a transparent insulating film, a plasma display panel, a method of manufacturing paste, a method of manufacturing a transparent insulating film, and a method of manufacturing a plasma display panel.

2. Description of the Related Art

Figure 1:
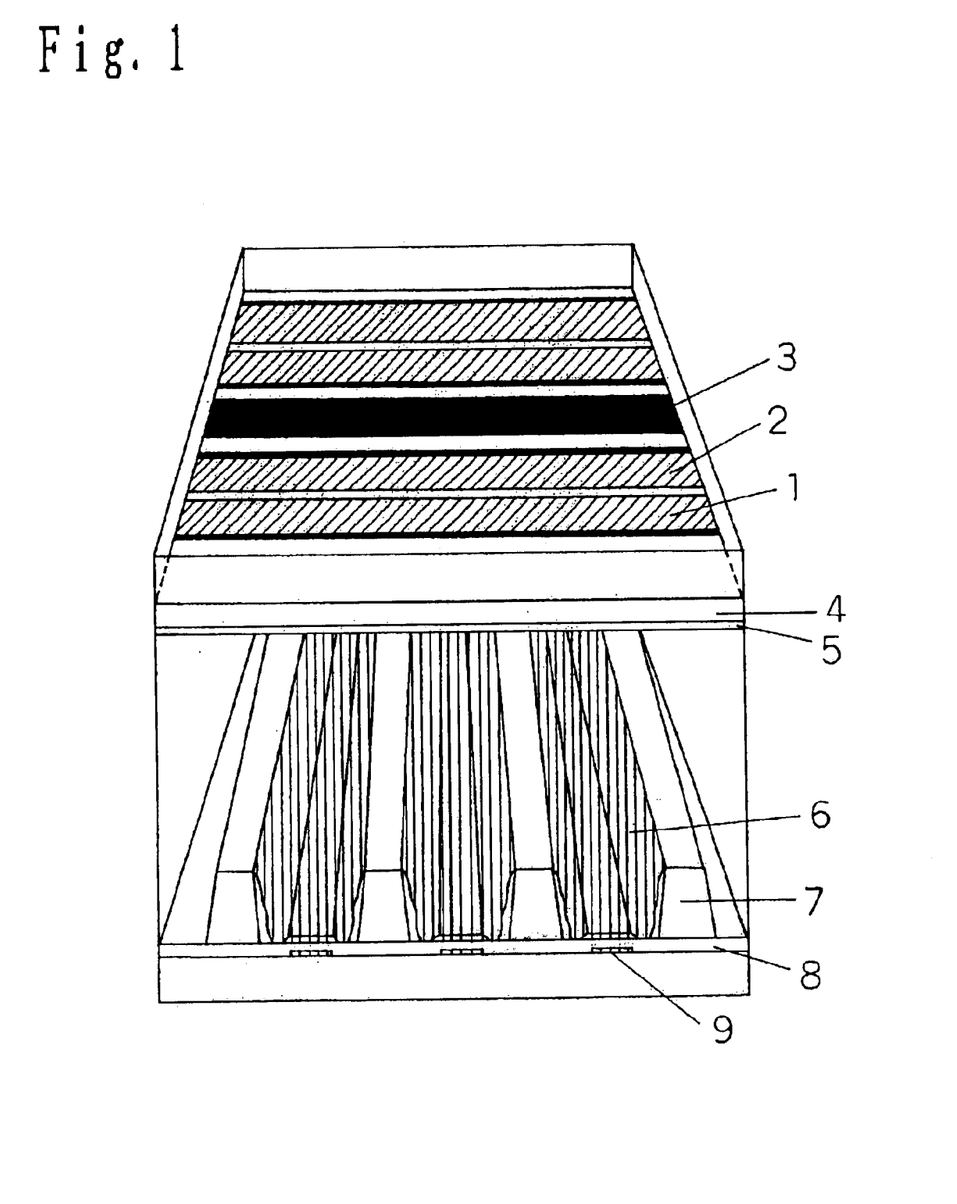
FIG. 1 is a structural diagram showing a plasma display.

First, referring to FIG. 1 showing a structural diagram of a plasma display panel, the configuration of a conventional plasma display panel will be discussed.

The plasma display panel is constituted by scanning electrodes 1, maintaining electrodes 2, a black stripe 3, a transparent insulating film 4, an MgO film 5, a phosphor 6, a rib 7, a ground surface dielectric 8, and data electrodes 9. Voltage is applied between the scanning electrodes 1 and the data electrodes 9 to discharge, and light emitted from the phosphor 6 passes through the transparent insulating film 4 and acts as image light.

Light can be emitted at a desired position of the phosphor (equivalent to a pixel) to obtain an image by selecting desired data electrodes 9 and scanning electrodes 1 and applying voltage.

The transparent insulating film 4 is about 50 $\mu$m in thickness and requires dielectric withstand voltage characteristics and optical characteristics. To be specific, dielectric withstand voltage can be obtained under a voltage of about AC 400V and an optical clouding degree (Hayes value, simply referred to as Hayes) is minimized.

A method of manufacturing a conventional transparent film will be discussed. A conventional transparent insulating film is obtained as follows: paste is manufactured by using powder glass having D10 of 0.5 $\mu$m, D50 of 1.6 $\mu$m, and D90 of 3 $\mu$m, the paste is applied by screen printing and die coating with a thickness of 50 $\mu$m, and drying and firing are performed.

Although a transparent insulating film manufactured by such a method has a dielectric withstand voltage of a passing standard, large Hayes of about 30% appears. The Hayes mainly depends upon a particle size of powder glass used as a material. Besides, a plasma display having a transparent insulating film with large Hayes is configured as if an image was seen through ground glass. Hence, an image becomes less sharp.

Figure 4A:
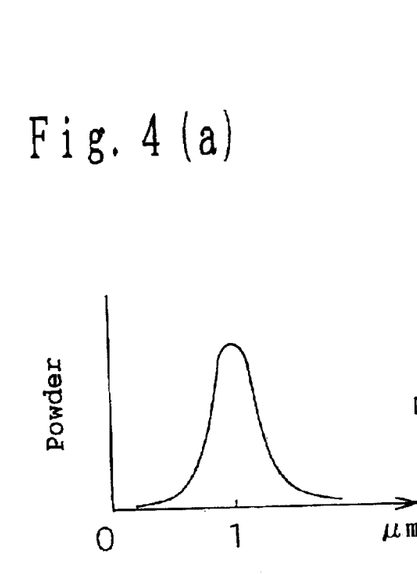
FIG. 4(a) is an explanatory drawing showing a particle size distribution of powder.
Figure 4B:
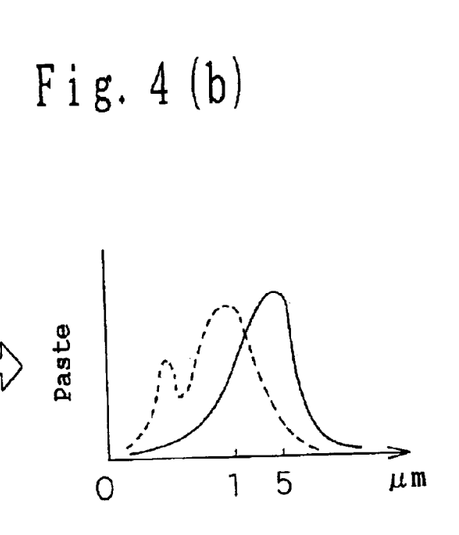
FIG. 4(b) is an explanatory drawing showing a particle size distribution of paste manufactured by the conventional method.

Additionally, when powder glass with D10 of 0.5 $\mu$m, D50 of 1.0 $\mu$m, and D90 of 1.5 $\mu$m is used, Hayes is expected to decrease, thereby improving the performance of a plasma display. However, particles are likely to cling together because they are small. Thus, it has been difficult for a conventional method to achieve dispersion to a first particle level, that is, to disperse particles one by one. Namely, although powder has a particle size distribution of FIG. 4(*a*), when paste is manufactured by a conventional method, a particle size distribution is shifted to a larger one indicated by a solid line of FIG. 4(*b*).

Further, a strong dispersing process of sand mill and the like is provided as a means of forcefully dispersing particles. However, such a dispersing process destroys particles of powder glass during dispersion. Moreover, physical properties are changed when particles are destroyed, resulting in deterioration in characteristics such as transmittance of light and dielectric withstand voltage. Namely, although powder has a particle size distribution of FIG. 4(*a*), when paste is manufactured by the conventional method, a particle size distribution is distorted as indicated by a broken line of FIG. 4(*b*).

SUMMARY OF THE INVENTION

The present invention is devised in view of the above conventional problems and has as its object the provision of paste for a transparent insulating film, a plasma display panel, a method of manufacturing paste, a method of manufacturing a transparent insulating film, and a method of manufacturing a plasma display panel that achieve more superior characteristics such as transmittance of light, Hayes, and dielectric withstand voltage.

One aspect of the present invention is Paste for a transparent insulating film of a plasma display panel, said paste including powder glass, which contains lead oxide, silicon oxide, boron oxide, barium oxide, and aluminum oxide, solvent, and resin.

Another aspect of the present invention is the paste for a transparent insulating film according to 1st invention, wherein said powder glass has a composition of boron oxide in 20 to 30 wt %, barium oxide in 15 to 20 wt %, and aluminum oxide in 3 to 6 wt %.

Still another aspect of the present invention is the paste for a transparent insulating film according to 1st invention, wherein said powder glass contains copper oxide.

Yet still another aspect of the present invention is Paste for a transparent insulating film of a plasma display panel, said paste including powder glass, which contains bismuth oxide, silicon oxide, boron oxide, barium oxide, and aluminum oxide, solvent, and resin.

Still yet another aspect of the present invention is the paste for a transparent insulating film, wherein said powder glass contains zinc oxide.

A further aspect of the present invention is the paste for a transparent insulating film, wherein said powder glass has a composition of boron oxide in 20 to 30 wt %, barium oxide in 15 to 20 wt %, and aluminum oxide in 3 to 6 wt %.

A still further aspect of the present invention is the paste for a transparent insulating film, wherein said powder glass contains copper oxide.

A yet further aspect of the present invention is a plasma display panel, comprising:

a glass substrate;

an electrode pattern formed on said glass substrate; and a transparent insulating film applied on said electrode pattern, wherein said transparent insulating film is formed using the paste for a transparent insulating film.

A still yet further aspect of the present invention is a plasma display panel, comprising:

a glass substrate;

an electrode pattern formed on said glass substrate; and a transparent insulating film applied on said electrode pattern, wherein said transparent insulating film is formed using the paste for a transparent insulating film.

An additional aspect of the present invention is a method of manufacturing paste, comprising the steps of: storing powder glass, solvent, and resin in a storage section; and A still additional aspect of the present invention is the method of manufacturing paste, wherein said powder glass has a dispersed particle size such that $D10$ is 0.4 to 0.6 $\mu$m, $D50$ is 0.8 to 1.2 $\mu$m, and $D90$ is 1.4 to 1.8 $\mu$m.

A yet additional aspect of the present invention is the method of manufacturing paste, wherein said powder glass has a dispersed particle size such that $D10$ is 0.2 to 0.8 $\mu$m, $D50$ is 1.0 to 2.0 $\mu$m, and $D90$ is 2.5 to 4.0 $\mu$m.

A still yet additional aspect of the present invention is a method of manufacturing paste, comprising the steps of:

storing powder glass, solvent, and resin in a sand mill storage section; and operating a sand mill disposed in said sand mill storage section at a peripheral speed of 10 m/s or less.

A supplementary aspect of the present invention is the method of manufacturing paste, wherein said powder glass has a dispersed particle size such that $D10$ is 0.4 to 0.6 $\mu$m, $D50$ is 0.8 to 1.2 $\mu$m, and $D90$ is 1.4 to 1.8 $\mu$m.

A still supplementary aspect of the present invention is a method of manufacturing paste, comprising the steps of:

storing powder glass, solvent, and resin in a storage section; and rotating a cylinder at a peripheral speed of 20 m/s or more, said cylinder having a hole or a slit on a side and having a bottom disposed in said storage section so as to be substantially in parallel with or inclined to a bottom of said storage section.

A yet supplementary aspect of the present invention is the method of manufacturing paste, wherein said powder glass has a dispersed particle size such that $D10$ is 0.2 to 0.8 $\mu$m, $D50$ is 1.0 to 2.0 $\mu$m, and $D90$ is 2.5 to 4.0 $\mu$m.

A still yet supplementary aspect of the present invention is a method of manufacturing a transparent insulating film, comprising the steps of:

manufacturing paste by using any one of the methods of manufacturing paste; and applying said manufactured paste on a glass substrate having an electrode pattern formed in advance, and drying and firing said paste.

Another aspect of the present invention is a method of manufacturing a plasma display panel, comprising the steps of:

forming an electrode pattern on a glass substrate; and manufacturing a transparent insulating film on said glass substrate having said electrode pattern formed thereon by using the method of manufacturing a transparent insulating film.

Still another aspect of the present invention is the method of manufacturing a plasma display panel, wherein a scanning electrode formed by using said electrode pattern has b value of 5 or less.

Besides, solvent of the present invention may contain at least one of diethyl Carbitol, Carbitol acetate, butyl Carbitol acetate, α-terpineol, and diethyl oxalate.

Also, resin of the present invention may contain at least one of ethyl cellulose, nitrocellulose, and polyvinylbutyral.

Additionally, powder glass may further contain lead oxide, boron oxide, and so on. Besides, lead oxide glass has been used as a material composition of a conventional transparent insulating film. This is mainly because lead oxide is excellent in flowability during a heating operation and a minute transparent film can be readily obtained with excellent transmittance of light and dielectric withstand voltage. However, in view of the influence on the environment, the replacement from lead oxide glass to non-lead oxide glass has been demanded regarding a transparent insulating film material. Bismuth oxide boron monoxide glass or the like is applicable as a candidate material. However, this material is influenced by the destruction of particles more than lead oxide glass when paste is manufactured, and dispersion is highly carried out. Hence, when particles are destroyed by using a strong dispersing process, transmittance of light and dielectric withstand voltage are largely reduced. The paste of the present invention, which is highly dispersed using bismuth oxide boron monoxide glass without destroying particles, has a small environmental load as well as excellent transmittance of light and dielectric withstand voltage.

Figure 4C:
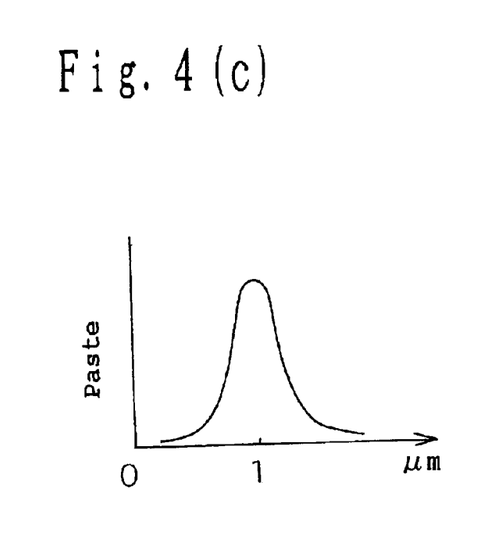
FIG. 4(c) is an explanatory drawing showing a particle size distribution of paste manufactured by a method of the present invention.

According to the present invention, characteristics shown in FIG. 4(c) are obtained, and powder is substantially equal to paste in particle size distribution in a preferable manner.

The entire disclosure of U.S. patent application Ser. No. 10/011,352, filed Dec. 5, 2001, is expressly incorporated by reference herein.

DETAILED DESCRIPTION OF THE PREFERRED EMBODIMENTS

The following will discuss embodiments of the present invention in accordance with accompanied drawings. For understanding, paste as comparative examples (Comparative Examples 1 and 2) will be described.

COMPARATIVE EXAMPLE 1

Powder glass having a softening point of 590° C. was used when $D10$ was 0.5 $\mu$m, $D50$ was 1.7 $\mu$m, and $D90$ was about 3.5 $\mu$m. The powder glass was mainly composed of lead oxide, boron oxide, and silicon oxide. The powder glass and butyl Carbitol acetate solvent, in which ethyl cellulose had been melted in advance, were mixed by a mixer. Dispersion was performed by a three-roll disperser and pasting was carried out.

The paste was diluted with butyl Carbitol acetate, and a dispersed particle size was measured by a laser particle size distribution analyzer. As a result, it was found that D10 was 0.5 μm, D50 was 1.7 μm, and D90 was 3.5 μm and powder glass was dispersed to a first particle level.

The paste was applied by screen printing and was fired at 600° C. at maximum after being dried. Thus, a transparent insulating film was formed.

Although the transparent insulating film, which was obtained by the above method with a thickness of 50 μm, had dielectric with stand voltage of AC400V or more, the used powder glass was large in particle size. Therefore, a film had a low filling density, a Hayes value was 40%, and optical characteristics were rejected (see Experiment 1 of Table 1).

|  | Comparative Example 1 | Comparative Example 2 | |
| --- | --- | --- | --- |
|  | Experiment 1 | Experiment 2 | Experiment 3 |
| Powder glass particle size (μm) | D10:0.5 D50:1.7 D90:3.5 | D10:0.8 D50:1.5 D90:2.5 | D10:0.5 D50:1.0 D90:1.5 |
| Dispersed particle size (μm) | D10:0.5 D50:1.7 D90:3.5 | D10:0.8 D50:1.9 D90:3.8 | D10:0.7 D50:1.7 D90:3.9 |
| Hayes value evaluation (%) | 40 Rejected | 42 Rejected (dispersing defect) | 44 Rejected (dispersing defect) |

Hayes was measured by a method according to JIS K 7361. A definition equation was Hayes value (%)=diffuse transmittance/total light transmittance×100. A passing level of Hayes was 30%.

COMPARATIVE EXAMPLE 2

The transparent insulating film obtained in Comparative Example 1 was rejected because a Hayes value was large. Hence, used powder glass was exchanged with powder glass smaller in particle size, and an experiment was conducted using the same steps. The results were shown by Experiments 2 and 3 of Table 1.

According to the results of Table 1, when used powder glass had a smaller particle size, sufficient dispersion was not made by three-roll dispersion. Further, since particles were likely to cling together, a dispersed particle size was increased and a Hayes value did not reach a passing level. The results were worse when using powder glass having a smaller particle size.

The following will discuss embodiments of a method of manufacturing paste, a method of manufacturing a transparent insulating film, and a method of manufacturing a plasma display panel according to the present invention. Additionally, paste for a transparent insulating film and a plasma display of the present invention will be also discussed while the method of manufacturing paste, the method of manufacturing a transparent insulating film, and the method of manufacturing a plasma display panel will be discussed.

Embodiment 1

In order to improve a Hayes value, the inventor studied a dispersing process using powder glass small in particle size.

Powder glass was mixed with solvent, in which resin had been melted in advance, by a mixer. A material component of powder glass, resin, and a material component of solvent were the same as those of Comparative Example 1. A particle size distribution is also equal to that of Comparative Example 1. A composition ratio of powder glass, resin, and solvent was 60%, 5%, and 35%. The mixed powder and solvent were put in an agitator of FIG. 2 and stirring was carried out.

Figure 2:
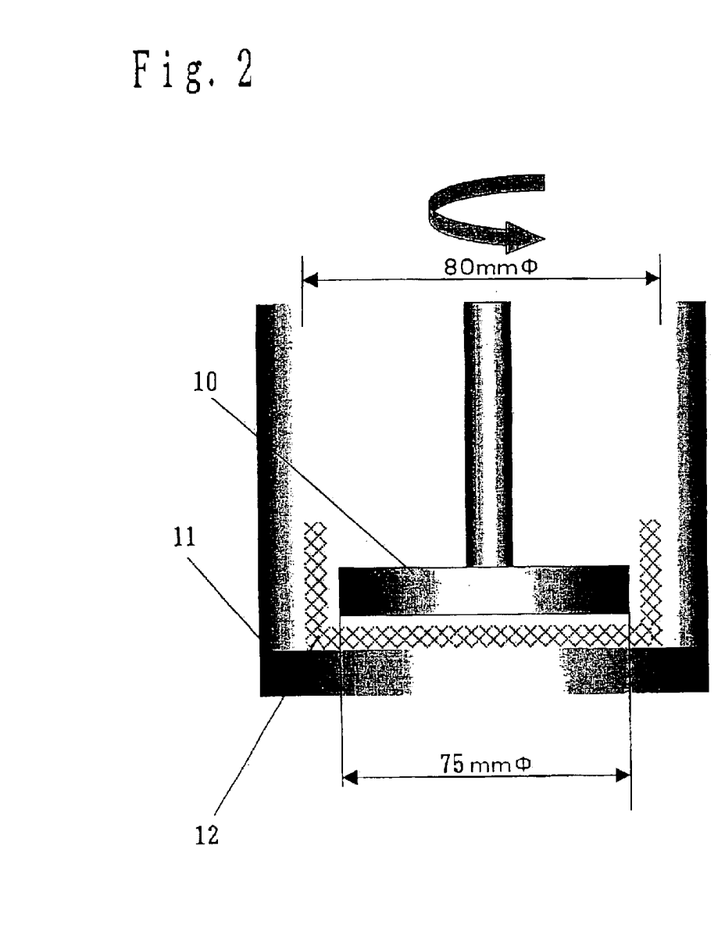
FIG. 2 is a sectional view showing the configuration of an agitator according to Embodiment 1 of the present invention.

The agitator was composed of a stirring blade (plate) 10 and a vessel (storage section) 11. Shearing force is applied to the paste 12 by rotating the stirring blade 10 at high speed so as to perform stirring and dispersion.

A treating amount was set at 200 ml per batch. Table 2 shows the relationship between a peripheral speed of the stirring blade 10 and treating time, a dispersed particle size, and a Hayes value.

|  | Peripheral speed: 30 m/s | Peripheral speed: 40 m/s | Peripheral speed: 50 m/s |
| --- | --- | --- | --- |
| Powder glass particle size (μm) | D10:0.5 D50:1.0 D90:1.5 | D10:0.5 D50:1.0 D90:1.5 | D10:0.5 D50:1.0 D90:1.5 |
| After one-minute treatment | D10:0.7 D50:1.7 D90:3.9 | D10:0.5 D50:1.0 D90:1.5 | D10:0.5 D50:1.0 D90:1.5 |
| After three-minute treatment | D10:0.7 D50:1.7 D90:3.9 | D10:0.5 D50:1.0 D90:1.5 | D10:0.5 D50:1.0 D90:1.5 |
| after five-minute treatment | D10:0.6 D50:1.4 D90:3.0 | D10:0.5 D50:1.0 D90:1.5 | D10:0.5 D50:1.0 D90:1.5 |
| Hayes value (%) | 31 | 15 | 15 |

According to Table 2, when stirring was carried out at a peripheral speed of 40 m/s or more, paste was obtained with extremely good dispersion. A Hayes value measured after the paste was applied, dried, and fired was 15, which was a remarkably good result. Further, dielectric withstand voltage reached a passing level.

Meanwhile, it was found that stirring with a peripheral speed of 30 m/s or less could not obtain sufficient dispersion.

Moreover, when powder glass had a particle size of D10: 0.3 to 0.5 μm, D50: 0.8 to 1.2 μm, and D90: 1.4 to 1.8 μm, the same results were obtained as the present embodiment.

Besides, when the solvent contained at least one of diethyl Carbitol, Carbitol acetate, α-terpineol, and diethyloxalate, the same results were obtained.

Moreover, when the resin contains at least one of ethyl cellulose, nitrocellulose, and polyvinyl butyral, the same results were obtained.

Embodiment 2

In order to improve a Hayes value, another dispersing process was studied using powder glass with a smaller particle size.

By using a mixer powder glass was mixed with solvent, in which resin had been melted in advance. A material composition of powder glass, resin, and a material composition of solvent were the same as those of Comparative Example 1, and a particle size distribution was the same as that of Experiment 3.

A composition ratio of powder glass, resin, and solvent was 60%, 5%, and 35%. The mixed powder and solvent were put in a sand mill of FIG. 3 to perform dispersion.

Figure 3:
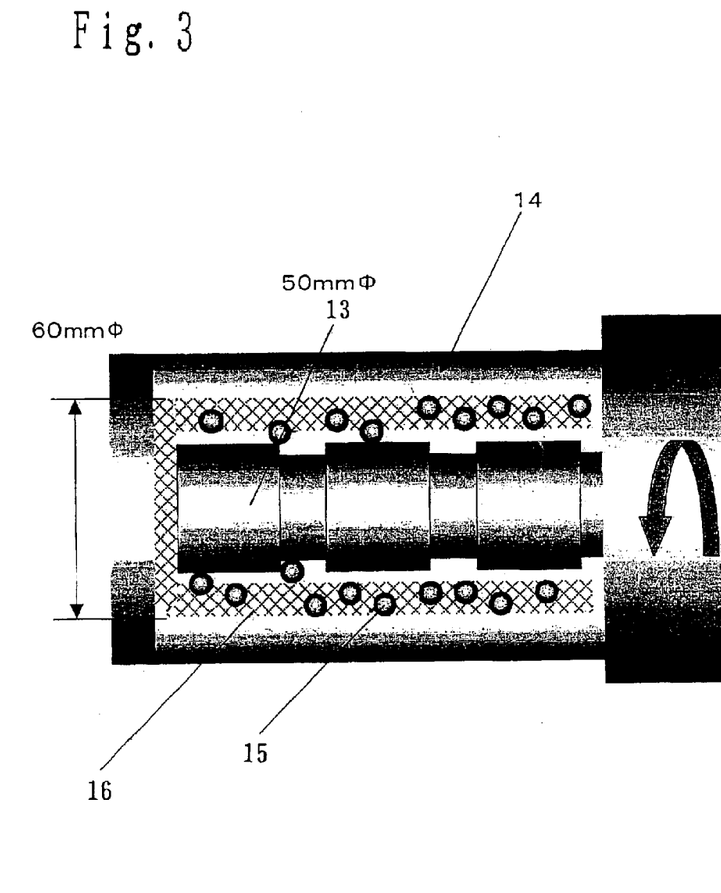
FIG. 3 is a sectional view showing the configuration of a sand mill according to Embodiment 2 of the present invention.

The sand mill was composed of a rotor (sand mill) 13, a vessel (sand mill storage section) 14, beads 14, and paste 16. The beads 15 were moved by rotating the rotor 13 at high speed, and impact was applied to the paste 16 to perform dispersion.

A treating amount was set at 200 ml per batch. Table 3 shows the relationship between a peripheral speed of the rotor 13 and treating time, a dispersed particle size, and a Hayes value.

|  | Peripheral speed: 5 m/s | Peripheral speed: 10 m/s | Peripheral speed: 15 m/s |
|---|---|---|---|
| Powder glass particle size (μm) | D10:0.5<br>D50:1.0<br>D90:1.5 | D10:0.5<br>D50:1.0<br>D90:1.5 | D10:0.5<br>D50:1.0<br>D90:1.5 |
| After one-minute treatment | D10:0.7<br>D50:1.7<br>D90:3.0 | D10:0.7<br>D50:1.3<br>D90:2.5 | D10:0.4<br>D50:1.0<br>D90:2.0 |
| After three-minute treatment | D10:0.5<br>D50:1.0<br>D90:1.5 | D10:0.5<br>D50:1.0<br>D90:1.5 | D10:0.2<br>D50:0.7<br>D90:1.7 |
| After five-minute treatment | D10:0.5<br>D50:1.0<br>D90:1.5 | D10:0.5<br>D50:1.0<br>D90:1.5 | D10:0.2<br>D50:0.7<br>D90:1.3 |
| Hayes value (%) | 14 | 15 | 33 |

According to Table 3, when dispersion was carried out at a peripheral speed of 10 m/s or less, paste was obtained with extremely good dispersion. A Hayes value measured after the paste was applied, dried, and fired was 14 to 15, achieving a remarkably good result. Further, dielectric withstand voltage also reached a passing level.

Meanwhile, it was found that impact to the paste was too strong at a peripheral speed of 15 m/s or more, particles of the powder glass were crushed, and Hayes was deteriorated.

Also, it was found that when powder glass had a particle size of D10: 0.3 to 0.5 μm, D50: 0.8 to 1.2 μm, and D90: 1.4 to 1.8 μm, the same results were obtained as the present embodiment.

Besides, when the solvent contained at least one of diethyl Carbitol, Carbitol acetate, α-terpineol, and diethyl oxalate, the same results were obtained. Moreover, when the resin contained at least one of ethyl cellulose, nitrocellulose, and polyvinyl butyral, the same results were obtained.

As described above, according to the present embodiment, it was possible to obtain the superior paste, the transparent insulating film having excellent balance of dielectric withstand voltage and a Hayes value, and the plasma display panel having the transparent insulating film.

Embodiment 3

Powder glass was pre-mixed with solvent, in which resin had been melted in advance, by a mixer to manufacture paste. As a material of powder glass, resin, and a material of solvent, powder glass having at least bismuth oxide, boron oxide, and silicon oxide as main components, ethyl cellulose, and Carbitol acetate were used respectively. Further, the powder glass had particle size distribution such that D10 was 0.4 μm, D50 was 1.5 μm, and D90 was 3.0 μm. A composition ratio of the powder glass, resin, and solvent was 60%, 5%, and 35%. Or, the paste may contain powder glass having at least lead oxide, boron oxide, and silicon oxide as main components.

Figure 5:
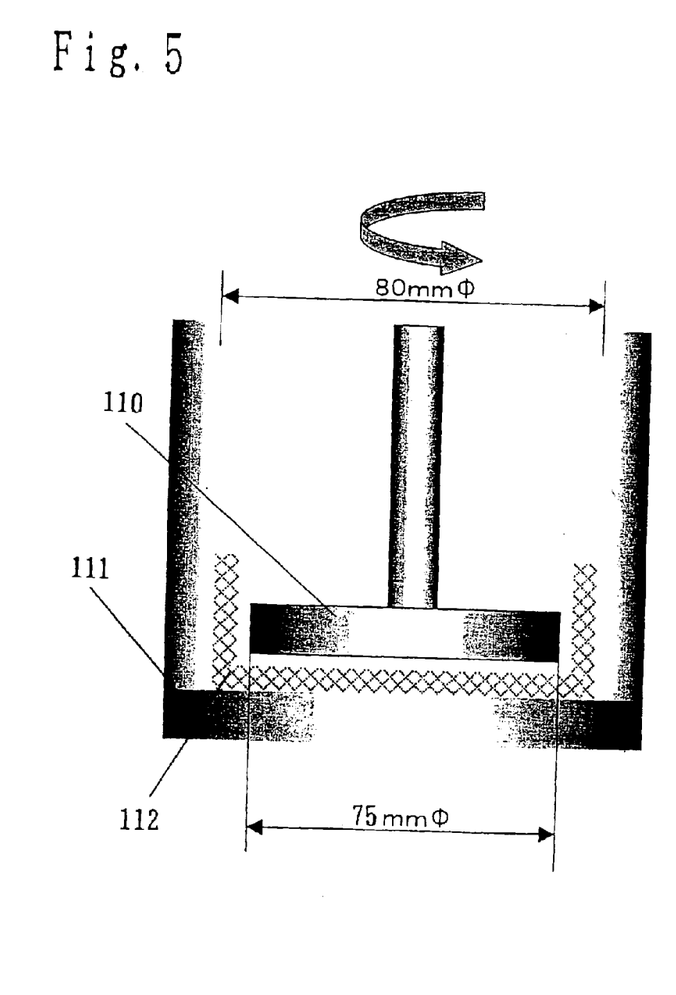
FIG. 5 is an explanatory drawing showing a method of manufacturing paste according to Embodiment 3 of the present invention.

Next, paste 112 after mixing was put in a vessel (storage section) 111 of a manufacturing device of paste in FIG. 5, and dispersion was carried out. The manufacturing device of paste was composed of a disc-shaped stirring blade (plate) 110, and a vessel 111. The stirring blade 110 was disposed in the vessel 111 substantially in parallel with the bottom of the vessel 111, and the stirring blade 110 was rotated on the surface where the it was disposed.

And then, shearing force was applied to the paste 112 by rotating the stirring blade 110 at high speed to carry out dispersion. A treating amount was set at, for example, 200 ml per batch. The vessel had the following dimensions: the stirring blade 110 was, for example, 75 mmφ in diameter and the vessel 111 was, for example, 80 mmφ in internal diameter.

Table 4 shows the relationship between a peripheral speed of the stirring blade 110 and treating time, a dispersed particle size, and a Hayes value.

|  | Peripheral speed: 30 m/s | Peripheral speed: 40 m/s | Peripheral speed: 50 m/s |
|---|---|---|---|
| Powder glass particle size (μm) | D10:0.4<br>D50:1.5<br>D90:3.0 | D10:0.4<br>D50:1.5<br>D90:3.0 | D10:0.4<br>D50:1.5<br>D90:3.0 |
| After one-minute treatment | D10:0.7<br>D50:1.7<br>D90:3.9 | D10:0.4<br>D50:1.5<br>D90:3.0 | D10:0.4<br>D50:1.5<br>D90:3.0 |
| After three-minute treatment | D10:0.7<br>D50:1.7<br>D90:3.9 | D10:0.4<br>D50:1.5<br>D90:3.0 | D10:0.4<br>D50:1.5<br>D90:3.0 |
| After five-minute treatment | D10:0.7<br>D50:1.7<br>D90:3.9 | D10:0.4<br>D50:1.5<br>D90:3.0 | D10:0.4<br>D50:1.5<br>D90:3.0 |
| Hayes value | 31 | 15 | 15 |

And then, the stirred paste was applied by screen printing and was fired at 600° C. at maximum after being dried. Thus, a transparent insulating film was formed.

When dielectric withstand voltage of the transparent insulating film, which was obtained with a thickness of 40 μm by the above method, was evaluated, dielectric withstand voltage was AC600V or more, which reached a passing standard. Namely, sufficient dielectric withstand voltage was provided for driving a PDP panel in practical use. Hayes (clouding degree) of optical characteristics was measured by a method according to JIS K 7361. The definition equation was Hayes value (%)=diffuse transmittance/total light transmittance×100. The passing level of Hayes was 30% or less and was satisfied.

According to Table 4, when dispersion was performed at a peripheral speed of 40 m/s or more, paste was obtained with extremely good dispersion. After the paste was applied, dried, and fired, a measured Hayes value was 15, which was an extremely good result. It was found that sufficient dispersion was not obtained at a peripheral speed of 30 m/s.

Additionally, it was found that when powder glass had a particle size of D10: 0.2 to 0.8 μm, D50: 1.0 to 2.0 μm, and D90: 2.5 to 4.0 μm, the same results as the above embodiment were obtained. Besides, although an upper limit of a peripheral speed was determined by a mechanical accuracy limit of a disperser, an actual limit of a peripheral speed was about 70 m/s.

Moreover, when the solvent contained at least one of diethyl Carbitol, Carbitol acetate, α-terpineol, and diethyl oxalate, the same results were obtained. Moreover, when the resin contained at least one of ethylcellulose, nitrocellulose, and polyvinyl butyral, the same results were obtained.

Embodiment 4

Powder glass was pre-mixed with solvent, in which resin had been melted in advance, by a mixer to manufacture paste. As a material of powder glass, resin, and a material of solvent, powder glass having at least bismuth oxide, boron oxide, and silicon oxide as main components, ethylcellulose, and carbitol acetate were used respectively. Further, the powder glass had a particle size distribution such that D10 was 0.4 μm, D50 was 1.5 μm, and D90 was 3.0 μm. A composition ratio of the powder glass, resin, and solvent was 60%, 5%, and 35%. Or, the paste may contain powder glass having at least lead oxide, boron oxide, and silicon oxide as main components.

Figure 6:
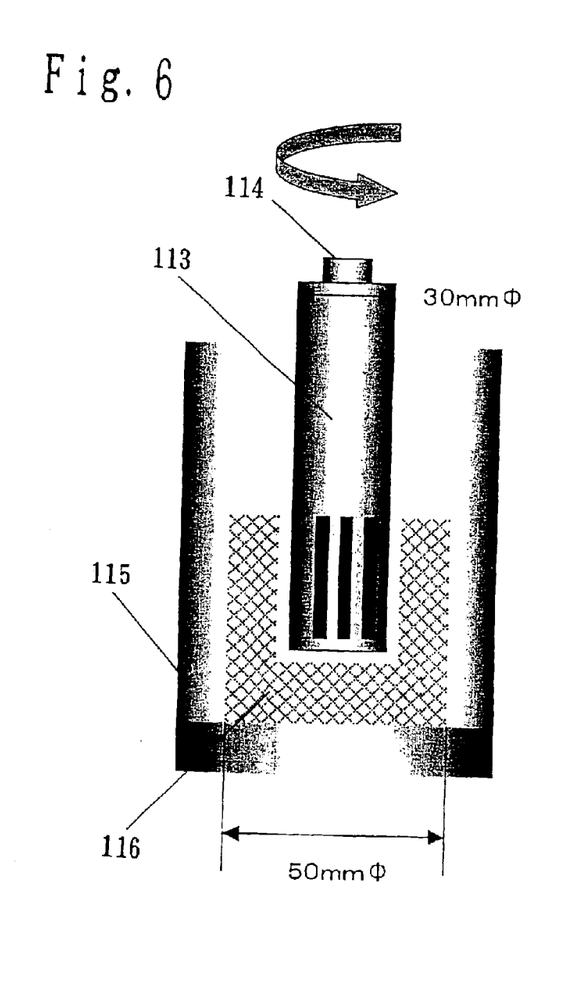
FIG. 6 is an explanatory drawing showing a method of manufacturing paste according to Embodiment 4 of the present invention.

And then, paste 116 after mixing was put in a vessel (storage section) 115 of a manufacturing device of paste in FIG. 6, and dispersion was carried out. The manufacturing device of paste has a double cylinder configuration, which was composed of an outer cylinder with slits (cylinder) 113, an internal cylinder 114, and a vessel 115. The slits on the outer cylinder 113 were disposed on the side of the cylindrical outer cylinder with slits 113 substantially in parallel with an axis of the outer cylinder with slits 113. The bottom of the outer cylinder with slits 113 was disposed in the internal cylinder 114 substantially in parallel with the bottom of the internal cylinder 114. The outer cylinder with slits 113 was rotated at a disposed position while its axis substantially serves as a rotating axis.

And then, shearing force was applied to the paste 116 by rotating the outer cylinder with slits 113 at high speed to perform dispersion. A treating amount was set at, for example, 400 ml per batch. The dimensions of the vessel were as follows: the internal cylinder 114 was, for example, 30 mmφ in diameter and the vessel 115 was, for example, 50 mmφ in internal diameter.

Table 5 shows the relationship between a peripheral speed of the outer cylinder with slits and treating time, a dispersed particle size, and a Hayes value.

|  | Peripheral speed: 15 m/s | Peripheral speed: 20 m/s | Peripheral speed: 30 m/s |
|---|---|---|---|
| Powder glass particle size (μm) | D10:0.4<br>D50:1.5<br>D90:3.0 | D10:0.4<br>D50:1.5<br>D90:3.0 | D10:0.4<br>D50:1.5<br>D90:3.0 |
| After one-minute treatment | D10:0.8<br>D50:1.8<br>D90:4.3 | D10:0.4<br>D50:1.5<br>D90:3.0 | D10:0.4<br>D50:1.5<br>D90:3.0 |
| After three-minute treatment | D10:0.8<br>D50:1.8<br>D90:4.3 | D10:0.4<br>D50:1.5<br>D90:3.0 | D10:0.4<br>D50:1.5<br>D90:3.0 |
| After five-minute treatment | D10:0.7<br>D50:1.7<br>D90:4.3 | D10:0.4<br>D50:1.5<br>D90:3.0 | D10:0.4<br>D50:1.5<br>D90:3.0 |
| Hayes value | 31 | 15 | 15 |

And then, stirred paste was applied by screen printing and was fired at 600° C. at maximum after being dried. Thus, a transparent insulating film was formed.

When dielectric withstand voltage was evaluated regarding the transparent insulating film, which was obtained with a thickness of 40 μm by the above method, the dielectric withstand voltage was AC600V or more, which reached a passing standard. Further, Hayes (clouding degree) of optical characteristics as measured by the method according to JIS K 7361.

According to Table 5, when dispersion was carried out at a peripheral speed of 20 m/s or more, paste was obtained with extremely good dispersion. After the paste was applied, dried, and fired, a measured Hayes value was 15, which was an extremely good result. It was found that sufficient dispersion was not obtained at a peripheral speed of 15 m/s. It was found that when powder glass had a particle size of D10: 0.2 to 0.8 μm, D50: 1.0 to 2.0 μm, and D90: 2.5 to 4.0 μm, the same results were obtained as the present embodiment.

Moreover, when the solvent contained at least one of diethyl Carbitol, Carbitol acetate, α-terpineol, and diethyl oxalate, the same results were obtained. Moreover, when the resin contained at least one of ethyl cellulose, nitrocellulose, and polyvinyl butyral, the same results were obtained.

Additionally, regarding a scanning electrode formed by the paste according to the above-embodiments containing powder glass, solvent, and resin, the powder glass having at least bismuth oxide, boron oxide, and silicon oxide as main components, b value indicative of chromaticity of yellow was 5 or less. A plasma display panel having such scanning electrodes could advantageously provide a less yellowish image as compared with a plasma display panel having scanning electrodes, which were formed by paste containing powder glass having the conventional bismuth oxide and the like as main components. Additionally, regarding the scanning electrode formed by paste containing powder glass having the conventional bismuth oxide and the like as main components, b value was 10 or more. Further, such coloring of yellow was relatively disadvantageous when a scanning electrode was an Ag electrode but was hardly advantageous when a scanning electrode was a Cu—Cr electrode.

Embodiment 5

In the present embodiment, lead oxide powder glass (glass frit), which contains lead oxide, silicon oxide, boron oxide, barium oxide, and aluminum oxide, solvent (butyl Carbitol acetate solvent), and resin (ethyl cellulose) were used to prepare paste for a transparent insulating film. Table 6 shows a specific glass composition, a method of manufacturing paste, and film characteristics.

|  | Invented composition 1 | Invented composition 1 |
|---|---|---|
| Glass composition |  |  |
| Lead oxide | 62 wt % | 62 wt % |
| Silicon oxide | in total | in total |
| Zinc oxide | — | — |
| Boron oxide | 20 wt % | 20 wt % |
| Barium oxide | 15 wt % | 15 wt % |
| Aluminum oxide | 3 wt % | 3 wt % |
| Calcium oxide | — | — |
| Magnesium oxide | — | — |
| Method of manufacturing paste | Conventional method | Invented method |
| Film characteristics |  |  |
| Film thickness | 30 μm | 30 μm |
| Determination of total light transmittance | 92%<br>◯ | 92%<br>◯ |
| Determination of Hayes | 13%<br>◯ | 13%<br>◯ |
| Determination of dielectric withstand voltage | AC600 V<br>◯ | AC600 V<br>◯ |
| Determination of coloring | 7<br>◯ | 3<br>◎ |

Since the invented composition 1 is used as a glass composition, good film characteristics were obtained when the conventional method was used as a method of manufacturing paste as well as when the invented method (method of manufacturing paste in the above Embodiment 4) was used. For comparison, Table 7 shows that conventional compositions 1 and 2 are used as a glass composition and the conventional method was used as a method of manufacturing paste.

Besides, such a transparent insulating film requires the following practical characteristics: a film thickness of 30 to 40 μm, total light transmittance of 85% or more, Hayes of 15% or less, dielectric withstand voltage of AV500V, b value of coloring, that is, chromaticity of about 8 or less (preferable at 5 or less) on a surface of an Ag electrode.

of manufacturing paste of the above-mentioned Embodiment 4) was used as a method of manufacturing paste. Table 8 specifically shows a glass composition, a method of manufacturing paste, and film characteristics.

|  | Invented composition 2 | Invented composition 3 | Invented composition 4 | Invented composition 5 |
|---|---|---|---|---|
| Glass composition |  |  |  |  |
| Lead oxide | 62 wt % | 53 wt % | 46 wt % | 46 wt % |
| Silicon oxide | in total | in total | in total | in total |
| Zinc oxide | — | — | — | — |
| Boron oxide | 17 wt % | 25 wt % | 30 wt % | 32 wt % |
| Barium oxide | 13 wt % | 18 wt % | 20 wt % | 22 wt % |
| Aluminum oxide | 2 wt % | 4 wt % | 6 wt % | 8 wt % |
| Calcium oxide | — | — | — | — |
| Magnesium oxide | — | — | — | — |
| Method of manufacturing paste | Invented method | Invented method | Invented method | Invented method |
| Film characteristics |  |  |  |  |
| Film thickness | 30 μm | 30 μm | 30 μm | 30 μm |
| Determination of total light transmittance | 84% X | 92% ○ | 90% ○ | 83% X |
| Determination of Hayes | 17% X | 13% ○ | 14% ○ | 18% X |
| Determination of dielectric withstand voltage | AC500 V ○ | AC600 V ○ | AC550 V ○ | AC500 V ○ |
| Determination of coloring | 2 ◎ | 3 ◎ | 3 ◎ | 3 ◎ |

Since the invented compositions 2 to 5 are used as a glass composition, considerably good results were obtained regarding dielectric withstand voltage and coloring. Additionally, as for the invented compositions 2 and 5, a total light transmittance and Hayes remained at the same level as the conventional composition (see Table 7).

According to the above description, it was understood that when a powder glass composition has boron oxide of 20 to 30 wt %, barium oxide of 15 to 20 wt %, and aluminum oxide of 3 to 6 wt %, particularly excellent film characteristics are obtained.

Embodiment 7

In the present embodiment, non-lead oxide powder glass (glass frit) containing bismuth oxide, silicon oxide, zinc oxide, boron oxide, barium oxide, and aluminum oxide, solvent (butyl Carbitol acetate solvent), and resin (ethyl cellulose) were used to prepare paste for a transparent insulating film. The present embodiment is characterized in that bismuth oxide was used instead of lead oxide of the above-mentioned Embodiments 5 and 6 in view of environmental cohabitation. Additionally, although zinc oxide is not absolutely necessary, the inventor confirmed by experiments that more desirable results were obtained by using zinc oxide. Table 9 specifically shows a glass composition, a method of manufacturing paste, and film characteristics.

|  | Conventional composition 1 | Conventional composition 2 |
|---|---|---|
| Glass composition |  |  |
| Lead oxide | 65 wt % | 70 wt % |
| Silicon oxide | 25 wt % | 28 wt % |
| Zinc oxide | — | — |
| Boron oxide | 5 wt % | — |
| Barium oxide | — | — |
| Aluminum oxide | — | — |
| Calcium oxide | 5 wt % | — |
| Magnesium oxide | — | 2 wt % |
| Method of manufacturing paste | Conventional method | Conventional method |
| Film characteristics |  |  |
| Film thickness | 30 μm | 30 μm |
| Determination of total light transmittance | 80% X | 83% X |
| Determination of Hayes | 30% X | 20% X |
| Determination of dielectric withstand voltage | AC400 V X | AC360 V X |
| Determination of coloring | 6 ○ | 7 ○ |

Embodiment 6

In the present embodiment as well, like the above-mentioned Embodiment 5, lead oxide powder glass containing lead oxide, silicon oxide, boron oxide, barium oxide, and aluminum oxide, solvent, and resin were used to prepare paste for a transparent insulating film. However, in the present embodiment, compositions of lead oxide, silicon oxide, boron oxide, barium oxide, and aluminum oxide were changed in various ways, and an invented method (method

|  | Invented composition 6 | Invented composition 6 |
|---|---|---|
| Glass composition |  |  |
| Bismuth oxide | 62 wt % | 62 wt % |
| Silicon oxide | in total | in total |
| Zinc oxide |  |  |

-continued

|  | Invented composition 6 | Invented composition 6 |
|---|---|---|
| Boron oxide | 20 wt % | 20 wt % |
| Barium oxide | 15 wt % | 15 wt % |
| Aluminum oxide | 3 wt % | 3 wt % |
| Calcium oxide | — | — |
| Magnesium oxide | — | — |
| Method of manufacturing paste | Conventional method | Invented method |
| Film characteristics |  |  |
| Film thickness | 30 μm | 30 μm |
| Determination of total light transmittance | 92% ◯ | 92% ◯ |
| Determination of Hayes | 13% ◯ | 13% ◯ |
| Determination of dielectric withstand voltage | AC600 V ◯ | AC600 V ◯ |
| Determination of coloring | 8 ◯ | 4 ◎ |

Since the invented composition 6 was used as a glass composition, good film characteristics were obtained when the conventional method was used as a method of manufacturing paste as well as when the invented method (method of manufacturing paste in the above-mentioned Embodiment 4) was used. For comparison, Table 10 shows that conventional compositions 3 and 4 were used as a glass composition and the conventional method was used as a method of manufacturing paste.

|  | Conventional composition 3 | Conventional composition 4 |
|---|---|---|
| Glass composition |  |  |
| Bismuth oxide | 65 wt % | 70 wt % |
| Silicon oxide | 20 wt % | 27 wt % |
| Zinc oxide | — | — |

-continued

|  | Conventional composition 3 | Conventional composition 4 |
|---|---|---|
| Boron oxide | 10 wt % | — |
| Barium oxide | — | — |
| Aluminum oxide | — | — |
| Calcium oxide | 5 wt % | — |
| Magnesium oxide | — | 3 wt % |
| Method of manufacturing paste | Conventional method | Conventional method |
| Film characteristics |  |  |
| Film thickness | 30 μm | 30 μm |
| Determination of total light transmittance | 80% X | 83% X |
| Determination of Hayes | 30% X | 20% X |
| Determination of dielectric withstand voltage | AC400 V X | AC360 V X |
| Determination of coloring | 6 ◯ | 7 ◯ |

Embodiment 8

In the present embodiment as well, like the above-mentioned Embodiment 7, non-lead oxide powder glass containing bismuth oxide, silicon oxide, zinc oxide, boron oxide, barium oxide, and aluminum oxide, solvent, and resin were used to prepare paste for a transparent insulating film. However, in the present embodiment, compositions of bismuth oxide, silicon oxide, zinc oxide, boron oxide, barium oxide, and aluminum oxide are changed in various ways, and the invented method (method of manufacturing paste in the above-mentioned Embodiment 4) was used as a method of manufacturing paste. Table 11 specifically shows a glass composition, a method of manufacturing paste, and film characteristics.

|  | Invented composition 7 | Invented composition 8 | Invented composition 9 | Invented composition 10 |
|---|---|---|---|---|
| Glass composition |  |  |  |  |
| Bismuth oxide | 62 wt % in total | 53 wt % in total | 46 wt % in total | 46 wt % in total |
| Silicon oxide |  |  |  |  |
| Zinc oxide |  |  |  |  |
| Boron oxide | 17 wt % | 25 wt % | 28 wt % | 32 wt % |
| Barium oxide | 13 wt % | 18 wt % | 20 wt % | 22 wt % |
| Aluminum oxide | 2 wt % | 4 wt % | 6 wt % | 8 wt % |
| Calcium oxide | — | — | — | — |
| Magnesium oxide | — | — | — | — |
| Method of manufacturing paste | Invented method | Invented method | Invented method | Invented method |
| Film characteristics |  |  |  |  |
| Film thickness | 30 μm | 30 μm | 30 μm | 30 μm |
| Determination of total light transmittance | 84% X | 92% ◯ | 91% ◯ | 83% X |
| Determination of Hayes | 17% X | 13% ◯ | 14% ◯ | 18% X |
| Determination of dielectric withstand voltage | AC500 V ◯ | AC600 V ◯ | AC550 V ◯ | AC500 V ◯ |
| Determination of coloring | 2 ◎ | 4 ◎ | 4 ◎ | 4 ◎ |

Since the invented compositions 7 to 10 were used as a glass composition, considerably good results were obtained regarding dielectric withstand voltage and coloring. As for the invented compositions 7 and 10, total light transmittance and Hayes remained at the same level as the conventional composition (see Table 10).

According to the above description, like the above-mentioned Embodiment 6, it was understood that when boron oxide was 20 to 30 wt %, barium oxide was 15 to 20 wt %, and aluminum oxide was 3 to 6 wt % in the composition of powder glass, particularly good film characteristics were obtained.

Besides, in the above-mentioned embodiments 5 to 8, the method of manufacturing paste of the above-mentioned Embodiment 4 was used as a method of manufacturing paste. An applicable method is not limited to the above. It is surely possible to obtain desirable film characteristics even when the methods of manufacturing paste of Embodiments 1 to 3 are used.

Further, the powder glass of the present invention may contain copper oxide. It is possible to suppress the above coloring of yellow and so on by applying copper oxide of about 0.1 to 1 wt % to powder glass.

As described above, according to the embodiments of the present invention, it is possible to achieve a transparent insulating film having excellent balance of dielectric withstand voltage and optical characteristics and a plasma display having the transparent insulating film.

As described above, the present invention offers an advantage in that paste for a transparent insulating film can be provided while achieving better characteristics regarding transmittance of light, hayes, and dielectric withstand voltage.

| Description of Symbols | |
|---|---|
| 1 | Scanning electrode |
| 2 | Maintaining electrode |
| 3 | Black stripe |
| 4 | Transparent insulating film |
| 5 | MgO film |
| 6 | Phosphor film |
| 7 | Rib |
| 8 | Ground surface dielectric film |
| 9 | Data electrode |
| 10 | Stirring blade |
| 11 | Vessel |
| 12 | Paste |
| 13 | Rotor |
| 14 | Vessel |
| 15 | Beads |
| 16 | Paste |

What is claimed is:

1. A method of manufacturing a plasma display panel, the method comprising the steps of:

manufacturing paste using a predetermined method of manufacturing paste;

forming an electrode pattern on a glass substrate; and forming a transparent insulating film on said glass substrate by applying said manufactured paste to said glass substrate, and drying and firing said applied paste;

wherein said predetermined method of manufacturing paste comprises the steps of:

storing powder glass, solvent, and resin in a storage section; and rotating a plate at a peripheral speed of 40 m/s or more, said plate being disposed in said storage section so as to be substantially in parallel with or inclined to a bottom of said storage section.

2. The method of manufacturing a plasma display panel according to claim 1, wherein said powder glass has a dispersed particle size such that $D10$ is 0.4 to 0.6 $\mu$m, $D50$ is 0.8 to 1.2 $\mu$m, and $D90$ is 1.4 to 1.8 $\mu$m.

3. The method of manufacturing a plasma display panel according to claim 1, wherein said powder glass has a dispersed particle size such that $D10$ is 0.2 to 0.8 $\mu$m, $D50$ is 1.0 to 2.0 $\mu$m, and $D90$ is 2.5 to 4.0 $\mu$m.

4. A method of manufacturing a plasma display panel, the method comprising the steps of:

manufacturing paste using a predetermined method of manufacturing paste;

forming an electrode pattern on a glass substrate;

forming a transparent insulating film on said glass substrate by applying said manufactured paste to said glass substrate, and drying and firing said applied paste;

wherein said predetermined method of manufacturing paste comprises the steps of:

storing powder glass, solvent, and resin in a sand mill storage section; and operating a sand mill disposed in said sand mill storage section at a peripheral speed of 10 m/s or less.

5. The method of manufacturing a plasma display panel according to claim 4, wherein said powder glass has a dispersed particle size such that $D10$ is 0.4 to 0.6 $\mu$m, $D50$ is 0.8 to 1.2 $\mu$m, and $D90$ is 1.4 to 1.8 $\mu$m.

6. A method of manufacturing a plasma display panel, comprising the steps of:

manufacturing paste using a predetermined method of manufacturing paste;

forming an electrode pattern on a glass substrate;

forming a transparent insulating film on said glass substrate by applying said manufactured paste to said glass substrate, and drying and firing said applied paste;

wherein said predetermined method of manufacturing paste comprises the steps of:

storing powder glass, solvent, and resin in a storage section; and rotating a cylinder at a peripheral speed of 20 m/s or more, said cylinder having a hole or a slit on a side and having a bottom disposed in said storage section so as to be substantially in parallel with or inclined to a bottom of said storage section.

7. The method of manufacturing a plasma display panel according to claim 6, wherein said powder glass has a dispersed particle size such that $D10$ is 0.2 to 0.8 $\mu$m, $D50$ is 1.0 to 2.0 $\mu$m, and $D90$ is 2.5 to 4.0 $\mu$m.

8. The method of manufacturing a plasma display panel according to any of claims 1 to 7, wherein said electrode pattern comprises a scanning electrode having a value of indicative of chromaticity of 5 or less.

9. The method of manufacturing a plasma display panel according to any of claims 1 to 7, wherein said glass powder comprises 20 to 30 wt % boron oxide, 15 to 20 wt % barium oxide, and 3 to 6 wt % aluminum oxide.

* * * * *

UNITED STATES PATENT AND TRADEMARK OFFICE
CERTIFICATE OF CORRECTION

PATENT NO. : 6,875,463 B2  
DATED : April 5, 2005  
INVENTOR(S) : Tatsuo Mifune et al.

It is certified that error appears in the above-identified patent and that said Letters Patent is hereby corrected as shown below:

<u>Title page,</u>  
Item [75], Inventors, "Tastuo" should read -- Tatsuo --.

Signed and Sealed this

Thirteenth Day of September, 2005

JON W. DUDAS  
*Director of the United States Patent and Trademark Office*